US012671093B2

(12) United States Patent
Lee et al.

(10) Patent No.: US 12,671,093 B2
(45) Date of Patent: Jun. 30, 2026

(54) NEGATIVE ELECTRODE INCLUDING COATING LAYER AND ION TRANSPORT LAYER, AND LITHIUM SECONDARY BATTERY INCLUDING THE SAME

(71) Applicant: LG ENERGY SOLUTION, LTD., Seoul (KR)

(72) Inventors: Jung Pil Lee, Daejeon (KR); Sung Ju Cho, Daejeon (KR); Sul Cham Kim, Daejeon (KR); Hyea Eun Han, Daejeon (KR); Hoe Jin Hah, Daejeon (KR); Sang Jun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 566 days.

(21) Appl. No.: 18/030,268

(22) PCT Filed: Nov. 5, 2021

(86) PCT No.: PCT/KR2021/016035
§ 371 (c)(1),
(2) Date: Apr. 4, 2023

(87) PCT Pub. No.: WO2022/098151
PCT Pub. Date: May 12, 2022

(65) Prior Publication Data
US 2023/0378476 A1 Nov. 23, 2023

(30) Foreign Application Priority Data

Nov. 5, 2020 (KR) ........................ 10-2020-0146810
Mar. 16, 2021 (KR) ........................ 10-2021-0034266

(51) Int. Cl.
*H01M 50/583* (2021.01)
*H01M 4/62* (2006.01)
(Continued)

(52) U.S. Cl.
CPC .......... *H01M 4/667* (2013.01); *H01M 4/626* (2013.01); *H01M 4/661* (2013.01);
(Continued)

(58) Field of Classification Search
None
See application file for complete search history.

(56) References Cited

U.S. PATENT DOCUMENTS

2013/0143117 A1 6/2013 Koh et al.
2018/0226633 A1 8/2018 Fujiki et al.
(Continued)

FOREIGN PATENT DOCUMENTS

CN 109728291 A 5/2019
CN 110571413 A 12/2019
(Continued)

OTHER PUBLICATIONS

Huimin Zhang et al., "Lithiophilic-lithiophobic gradient interfacial layer for a highly stable lithium metal anode", Nature Communications, 2018, vol. 9, 3729, 45 pages.
(Continued)

*Primary Examiner* — Carlos Barcena
(74) *Attorney, Agent, or Firm* — Bryan Cave Leighton Paisner LLP

(57) ABSTRACT
A negative electrode for all-solid-state battery and a lithium secondary battery including the same are provided. The negative electrode includes a negative electrode current collector formed of an electrically conductive metal material, a coating layer formed on one surface or opposite surfaces of the negative electrode current collector, the coating layer including a lithiophilic material, and an ion transport layer formed on the coating layer, the ion transport layer including amorphous carbon configured to allow lithium ions to move therethrough.

20 Claims, 7 Drawing Sheets

(51) Int. Cl.
| | | |
|---|---|---|
| *H01M 4/66* | (2006.01) | |
| *H01M 10/0525* | (2010.01) | |
| *H01M 4/02* | (2006.01) | |

(52) U.S. Cl.
CPC ..... *H01M 10/0525* (2013.01); *H01M 50/583* (2021.01); *H01M 2004/027* (2013.01)

(56) References Cited

U.S. PATENT DOCUMENTS

| | | | |
|---|---|---|---|
| 2019/0027784 A1 | 1/2019 | Nose | |
| 2019/0051933 A1 | 2/2019 | Li et al. | |
| 2019/0157723 A1 | 5/2019 | Suzuki et al. | |
| 2019/0260065 A1* | 8/2019 | Yashiro | H01M 4/362 |
| 2020/0075990 A1 | 3/2020 | Park et al. | |
| 2020/0144575 A1* | 5/2020 | Ku | H01M 4/587 |
| 2020/0144599 A1 | 5/2020 | Lee et al. | |
| 2021/0210791 A1 | 7/2021 | Suzuki et al. | |
| 2021/0408522 A1 | 12/2021 | Fujiki et al. | |
| 2021/0408523 A1 | 12/2021 | Fujiki et al. | |
| 2023/0155109 A1 | 5/2023 | Suzuki et al. | |

FOREIGN PATENT DOCUMENTS

| | | |
|---|---|---|
| CN | 110817845 A | 2/2020 |
| CN | 110993954 A | 4/2020 |
| CN | 111755741 A | 10/2020 |
| EP | 4145565 A1 | 3/2023 |
| JP | 2005293960 A | 10/2005 |
| JP | 2019021515 A | 2/2019 |
| KR | 10-2013-0056902 A | 5/2013 |
| KR | 10-2013-0124098 A | 11/2013 |
| KR | 10-2017-0075482 A | 7/2017 |
| KR | 10-2018-0091678 A | 8/2018 |
| KR | 10-2019-0141990 A | 12/2019 |
| KR | 10-2104009 B1 | 4/2020 |
| KR | 10-2020-0052707 A | 5/2020 |
| KR | 10-2020-0069215 A | 6/2020 |
| KR | 10-2020-0076006 A | 6/2020 |
| KR | 10-2020-0078479 A | 7/2020 |
| KR | 10-2020-0113338 A | 10/2020 |
| KR | 10-2020-0117353 A | 10/2020 |
| KR | 10-2020-0128256 A | 11/2020 |
| KR | 10-2020-0134126 A | 12/2020 |

OTHER PUBLICATIONS

Zefu Zuo et al., "Lithiophilic Silver Coating on Lithium Metal Surface for Inhibiting Lithium Dendrites", Frontiers in Chemistry, vol. 8, Article 109, Feb. 2020, pp. 1-8.
Yong-Gun Lee et al., "High-energy long-cycling all-solid-state lithium metal batteries enabled by silver-carbon composite anodes", Nature Energy, vol. 5, 2020, pp. 299-308.
Na Zhang et al., "Regulating lithium nucleation and growth by zinc modified current collectors", Nano Research, 2020, pp. 1-8.

* cited by examiner

FIG. 2

NEGATIVE ELECTRODE INCLUDING COATING LAYER AND ION TRANSPORT LAYER, AND LITHIUM SECONDARY BATTERY INCLUDING THE SAME

CROSS-REFERENCE TO RELATED APPLICATION(S)

This application is a National Stage Application of International Application No. PCT/KR2021/016035, filed on Nov. 5, 2021, which claims the benefit of priority to Korean Patent Application No. 2020-0146810 filed on Nov. 5, 2020 and Korean Patent Application No. 2021-0034266 filed on Mar. 16, 2021, the disclosures of which are incorporated herein by reference in their entireties.

FIELD OF DISCLOSURE

The present disclosure relates to a negative electrode for all-solid-state batteries including a coating layer and an ion transport layer and a lithium secondary battery including the same. More particularly, the present disclosure relates to technology capable of preventing lithium plating from locally occurring on a negative electrode and specifying a lithium electrodeposition position, thereby preventing the occurrence of short circuit between a positive electrode and the negative electrode.

BACKGROUND

A lithium secondary battery, which is reusable and has high energy density, has attracted attention as a new energy source that has environmentally friendly characteristics, since the lithium secondary battery not only remarkably reduces the use of fossil fuels but also does not generate by-products as the result of the use of energy.

The lithium secondary battery has also been spotlighted as an energy source for devices having high output and high energy density, such as electric vehicles, as well as wearable devices or portable devices. As a result, research on a lithium secondary battery that has high operating voltage and energy density has been more actively conducted.

The lithium secondary battery is charged and discharged through a process in which lithium ions move between a positive electrode and a negative electrode. Some of the lithium ions moved to the negative electrode may be attached to the surface of the negative electrode to form a lithium nucleus, and the lithium nucleus may grow into lithium dendrites, which are a branch-shaped crystal.

If the lithium dendrites formed and grown on the surface of the negative electrode come into contact with the positive electrode, short circuit may occur in the lithium secondary battery, which shortens the lifespan of the lithium secondary battery and impedes securing stable performance of the lithium secondary battery.

For the above reason, a conventional lithium secondary battery uses graphite as a negative electrode material, whereby energy density of the lithium secondary battery is lowered.

In order to improve energy density, using lithium as a negative electrode active material in an all-solid-state battery with high stability has been proposed. As a method of using lithium as a negative electrode active material, a method of using lithium or a lithium alloy as a negative electrode active material or a method of using, as an active material, lithium deposited at the interface between a negative electrode current collector and a solid electrolyte by charging in the state that no negative electrode active material layer is formed on the negative electrode current collector may be used.

In the case that lithium is used as a negative electrode active material, lithium is deposited at the negative electrode side during charging. In the case that no negative electrode active material layer is formed, lithium is deposited on the negative electrode current collector. The lithium deposited at the negative electrode side, as described above, may grow into lithium dendrites through apertures in the solid electrolyte as the all-solid-state battery is repeatedly charged and discharged. The lithium dendrites may cause short circuit in the battery or may reduce capacity of the battery.

Patent Document 1 discloses an electrode including a composite layer constituted by a first lithiophilic layer, a second lithiophilic layer, and a perovskite layer in order to prevent generation of lithium dendrites.

In Patent Document 1, a structure in which lithiophilic layers are sequentially disposed on the surface of the electrode is provided, whereby lithium ions may be uniformly attached to the surface of the electrode, and therefore it is possible to prevent generation of lithium dendrites.

Patent Document 1 suggests improvement in lifespan characteristics of a lithium secondary battery including a liquid electrolytic solution, and recognizes a method of lowering potential at which a lithium nucleus is generated, thereby preventing generation of lithium dendrites, but does not suggest technology capable of specifying the position to which lithium is attached.

There is a high necessity for technology capable of preventing lithium ions from being locally plated on a portion of the surface of a negative electrode in a lithium secondary battery and preventing growth of lithium dendrites toward a positive electrode even though a lithium nucleus is formed.

(Related Art) Chinese Patent Application Publication No. 110571413 (2019 Dec. 13) ("Patent Document 1")

SUMMARY

Technical Problem

The present disclosure has been made in view of the above problems, and it is an object of the present disclosure to provide a negative electrode for all-solid-state batteries capable of preventing degradation in performance of a lithium secondary battery, particularly an all-solid-state battery having high energy density, due to lithium dendrites and extending the lifespan of the lithium secondary battery, thereby improving yield, and a lithium secondary battery including the same.

Technical Solution

In order to accomplish the above object, the present disclosure provides a negative electrode for all-solid-state batteries, the negative electrode including a negative electrode current collector formed of an electrically conductive metal material; a coating layer formed on one surface or opposite surfaces of the negative electrode current collector, the coating layer including a lithiophilic material; and an ion transport layer formed on the coating layer, the ion transport layer including amorphous carbon configured to allow lithium ions to move therethrough.

The ion transport layer may further include a binder.

The negative electrode current collector may not comprise a negative electrode mixture layer formed thereon.

The lithiophilic material may be one or more of a metal including Au, Ag, Pt, Zn, Si, or Mg, or a metal oxide including CuO, ZnO, CoO, or MnO.

The lithiophilic material constituting the coating layer may be nanoparticles, and metal nanoparticles or metal oxide nanoparticles may be attached to the negative electrode current collector.

In addition, the present disclosure provides a method of manufacturing the negative electrode for all-solid-state batteries. Specifically, the method may include (a) a step of preparing a negative electrode current collector, (b) a step of forming a coating layer including a lithiophilic material on at least one surface of the negative electrode current collector, and (c) a step of forming an ion transport layer on the coating layer, wherein the steps may be sequentially performed.

In addition, the present disclosure provides a lithium secondary battery including the negative electrode for all-solid-state batteries, a solid electrolyte layer, and a positive electrode.

In the lithium secondary battery according to the present disclosure, the lithiophilic material may be dispersed in the coating layer of the negative electrode for all-solid-state batteries, and lithium (Li) plating may occur on the lithiophilic material.

In the lithium secondary battery according to the present disclosure, lithium electrodeposition may occur on one surface of the ion transport layer of the negative electrode for all-solid-state batteries that faces the negative electrode current collector.

In the lithium secondary battery according to the present disclosure, the coating layer and the ion transport layer may be formed only on a first surface, which is one of first and second surfaces of the negative electrode current collector of the negative electrode for all-solid-state batteries, and a positive electrode may be disposed on the first surface to constitute a mono-cell.

In the mono-cell, the coating layer may be formed on the negative electrode current collector, and the ion transport layer may be formed on the coating layer.

The lithium secondary battery according to the present disclosure may include a bi-cell in which the coating layer and the ion transport layer may be formed on each of first and second surfaces of the negative electrode current collector of the negative electrode for all-solid-state batteries, and a first positive electrode and a second positive electrode may be disposed respectively on the first surface and the second surface.

In the bi-cell, the coating layer may be formed on the negative electrode current collector, and the ion transport layer may be formed on the coating layer.

In addition, the present disclosure may provide all possible combinations of the above solving means.

Advantageous Effects

As is apparent from the above description, in the present disclosure, a lithiophilic material is widely dispersed on a negative electrode current collector for all-solid-state batteries, whereby lithium moved to a negative electrode may be widely distributed on the negative electrode. Consequently, lithium is locally attached to the surface of the negative electrode current collector, whereby it is possible to prevent an increase in lithium nucleus generation energy.

In addition, an ion transport layer including amorphous carbon is formed on a coating layer including the lithiophilic material, whereby lithium ions may move in a direction toward the negative electrode current collector, and lithium is deposited on one surface of the ion transport layer in the direction toward the negative electrode current collector, and therefore it is possible to delay growth of lithium dendrites through the ion transport layer in a direction toward a positive electrode even though the lithium dendrites are formed.

It is possible to induce uniform electrodeposition of lithium on the surface of the negative electrode current collector due to a structure constituted by a combination of the coating layer including the lithiophilic material and the ion transport layer, as described above.

Consequently, it is possible to increase the lifespan of an all-solid-state battery including the negative electrode and to secure safety of the all-solid-state battery.

BRIEF DESCRIPTION OF DRAWINGS

FIG. 2 is an SEM photograph of a negative electrode manufactured according to Example 2.

DETAILED DESCRIPTION

Figure 1:
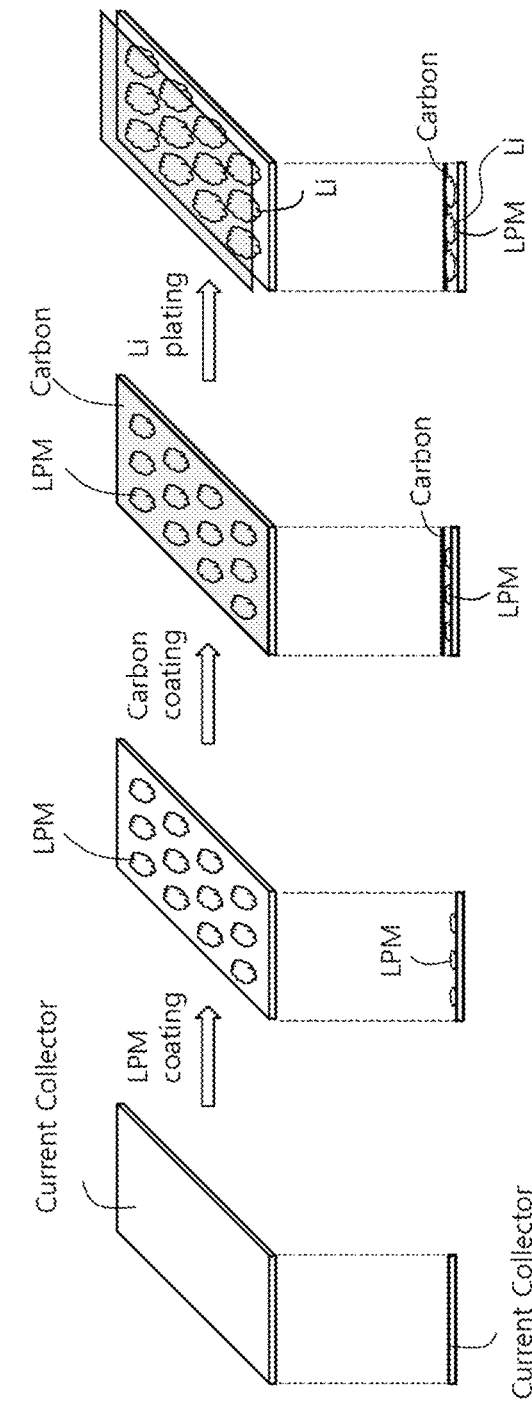
FIG. 1 is a schematic view showing a process of manufacturing a negative electrode according to the present disclosure.

Now, preferred embodiments of the present disclosure will be described in detail with reference to the accompanying drawings such that the present disclosure can be easily implemented by a person having ordinary skill in the art to which the present disclosure pertains. In describing the principle of operation of the preferred embodiments of the present disclosure in detail, however, a detailed description of known functions and configurations incorporated herein will be omitted when the same may obscure the subject matter of the present disclosure.

In addition, the same reference numbers will be used throughout the drawings to refer to parts that perform similar functions or operations. In the case that one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims, singular forms are intended to include plural forms unless mentioned otherwise.

Also, in the description of the invention and the claims, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

A negative electrode for all-solid-state batteries according to the present disclosure may include a negative electrode current collector formed of an electrically conductive metal material; a coating layer formed on one surface or opposite surfaces of the negative electrode current collector, the coating layer including a lithiophilic material; and an ion transport layer formed on the coating layer, the ion transport layer including amorphous carbon, through which lithium ions are movable.

The negative electrode for all-solid-state batteries according to the present disclosure is configured to have a structure in which no separate negative electrode mixture layer is provided on the negative electrode current collector. In this specification, therefore, that the coating layer is formed on the surface of the negative electrode has the same meaning as that the coating layer is formed on the surface of the negative electrode current collector.

The negative electrode current collector is not particularly restricted as long as the negative electrode current collector exhibits conductivity while the negative electrode current collector does not induce any chemical change in a lithium secondary battery. For example, the negative electrode current collector may be formed of copper, stainless steel, aluminum, nickel, titanium, or sintered carbon. Alternatively, the negative electrode current collector may be formed of copper or stainless steel, the surface of which is treated with carbon, nickel, titanium, or silver, or an aluminum-cadmium alloy. In addition, the negative electrode current collector may be configured in any of various forms, such as a film, a sheet, a foil, a net, a porous body, a foam body, and a non-woven fabric body, each of which has or does not have a micro-scale uneven pattern formed on the surface thereof.

For example, in the case that a sulfide-based solid electrolyte and a negative electrode current collector formed of copper are used, copper sulfate may be formed. In order to prevent this, a negative electrode current collector formed of nickel or stainless steel may be used.

Although the thickness of the negative electrode current collector is not particularly restricted, the thickness of the negative electrode current collector may be 5 μm to 30 μm, specifically 10 μm to 20 μm. If the thickness of the negative electrode current collector is greater than 30 μm, the capacity of the electrode per volume may be reduced. If the thickness of the negative electrode current collector is less than 5 μm, a folding phenomenon may occur at the time of manufacture of the electrode.

The lithiophilic material constituting the coating layer is a material that has high reactivity with lithium. When a positive electrode is coupled to the negative electrode having the coating layer and the ion transport layer formed thereon to manufacture a battery cell and then the battery cell is charged and discharged, lithium ions that have moved to the negative electrode are plated and electrodeposited on the lithiophilic material constituting the coating layer.

The lithiophilic material included in the coating layer may be one or more of a metal including Au, Ag, Pt, Zn, Si, or Mg and a metal oxide including CuO, ZnO, CoO, or MnO.

In the present disclosure, the lithiophilic material is dispersed over the surface of the negative electrode current collector. Alternatively, the lithiophilic material may be agglutinated so as to be disposed in an island shape such that the negative electrode current collector is partially exposed.

In a concrete example, the lithiophilic material may be distributed within a range of 5% to 100%, specifically a range of 10% to 90%, more specifically a range of 30% to 80%, of the total area of the negative electrode current collector. In addition, more specifically, the lithiophilic material may be distributed within a range of 50% to 70% of the total area of the negative electrode current collector.

If the area of the lithiophilic material is less than 5% of the total area of the negative electrode current collector, the distribution area of the lithiophilic material is small, whereby it is difficult to obtain the effect provided by the lithiophilic material, which is undesirable.

In the negative electrode for all-solid-state batteries according to the present disclosure, as described above, the lithiophilic material is not locally electrodeposited on only a portion of the surface of the negative electrode current collector but is dispersed over a wide range of the negative electrode current collector, whereby it is possible to lower lithium nucleation potential. That is, it is possible to minimize formation of a lithium nucleus at a specific region of the surface of the negative electrode current collector. Consequently, lithium may be uniformly electrodeposited and may grow on the surface of the negative electrode current collector, whereby it is possible to inhibit formation of lithium dendrites.

Also, in the present disclosure, the ion transport layer is formed on the coating layer, wherein lithium ions may move from the positive electrode to the negative electrode or from the negative electrode to the positive electrode through the ion transport layer without difficulty, and therefore it is possible to transport lithium ions moving to the negative electrode in a direction toward the negative electrode current collector.

In connection therewith, FIG. 1 is a schematic view showing a process of manufacturing a negative electrode according to the present disclosure.

Referring to FIG. 1, a coating layer including a lithiophilic material (LPM) is formed on a negative electrode current collector, and an ion transport layer including amorphous carbon is formed on the coating layer. Subsequently, a negative electrode manufactured as described above, a solid electrolyte layer, and a positive electrode are stacked to manufacture a battery. When the battery is charged and discharged, lithium ions that have moved to the negative electrode through the ion transport layer are attached to the lithiophilic material and are plated on the lithiophilic material. However, lithium does not penetrate through the ion transport layer even though the lithium grows.

That is, when the lithium plated on the coating layer grows, growth of the lithium is impeded by the ion transport layer, and therefore it is possible to prevent a conventional problem in that lithium dendrites formed as the result of growth of a lithium nucleus extend in a direction toward the positive electrode, thus coming into contact with the positive electrode.

In the negative electrode for all-solid-state batteries according to the present disclosure, carbon black, such as acetylene black, Ketjen black, channel black, polytetrafluoroethylene black, lamp black, or thermal black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or a conductive material, such as a polyphenylene derivative, may be used as the ion transport layer. Specifically, the ion transport layer may include amorphous carbon such as carbon black.

The amorphous carbon has a structure in which the size of a hexagonal plane constituted by a carbon atom is small, stacking growth is not well developed and is thus disordered, and micro-crystallites constituted by the hexagonal plane are crosslinked, or the micro-crystallites are mixed with amorphous phase. Consequently, lithium ions may be inserted into apertures and the front end surface side generated by defects of the carbon layer and an incomplete stack structure, in addition to insertion between graphene layers.

The ion transport layer according to the present disclosure includes amorphous carbon, wherein the amorphous carbon smoothly transports lithium ions toward the negative electrode current collector. Lithium electrodeposition is performed on the outer surface of the ion transport layer in a direction facing the negative electrode current collector, and no lithium electrodeposition is performed on the outer surface of the ion transport layer in the opposite direction. Consequently, no lithium dendrites are formed on the outer surface of the ion transport layer that faces the positive electrode, whereby the lifespan characteristics of a lithium secondary battery may be improved.

In contrast, when the ion transport layer is formed of crystalline graphite, such as natural graphite or artificial graphite, which is generally used as a negative electrode active material, lithium is electrodeposited on the outer surface of the ion transport layer that faces the positive electrode after lithium is intercalated into the crystalline graphite. When lithium is electrodeposited, as described above, to grow as lithium dendrites and then the lithium dendrites pass through the solid electrolyte layer, short circuit may occur.

Consequently, in the case that an ion transport layer including amorphous carbon is included, as in the present disclosure, it is possible to secure safety, compared to the case in which crystalline graphite is used as the ion transport layer.

In a concrete example, the ion transport layer may further include a binder in order to secure the force of binding between carbon materials, which are principal ingredients constituting the ion transport layer.

In addition, the ion transport layer may include a binder capable of increasing binding force of the ion transport layer to the coating layer and/or the negative electrode current collector.

That is, the binder may be used to secure the force of binding between materials constituting the ion transport layer, or may be used to secure the force of binding between the ion transport layer and the coating layer and/or the negative electrode current collector.

For example, the binder may include one or more selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer (EPDM) rubber, sulfonated EPDM, styrene butadiene rubber, fluoro rubber, and a copolymer thereof.

In addition, the present disclosure provides a method of manufacturing the negative electrode for all-solid-state batteries. Specifically, the method may include (a) a step of preparing a negative electrode current collector, (b) a step of forming a coating layer including a lithiophilic material on at least one surface of the negative electrode current collector, and (c) a step of forming an ion transport layer on the coating layer, wherein the steps may be sequentially performed.

The lithiophilic material constituting the coating layer may be nanoparticles, and metal nanoparticles or metal oxide nanoparticles may be attached to the negative electrode current collector.

As a method of forming the coating layer on the negative electrode current collector and a method of forming the ion transport layer, one or more selected from the group consisting of immersing, spin coating, dip coating, spray coating, doctor blade coating, solution casting, drop coating, physical vapor deposition (PVD), and chemical vapor deposition (CVD) may be independently used.

The method of forming the coating layer on the negative electrode current collector and the method of forming the ion transport layer may be performed as a dry coating method.

The present disclosure provides a lithium secondary battery configured to have a structure in which an electrode assembly including the negative electrode for all-solid-state batteries, a solid electrolyte layer, and a positive electrode is received in a battery case.

The positive electrode is manufactured, for example, by applying a positive electrode mixture including a positive electrode active material to a positive electrode current collector and drying the positive electrode mixture. The positive electrode mixture may further optionally include a binder, a conductive agent, and a filler, as needed.

The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be formed of stainless steel, aluminum, nickel, titanium, or sintered carbon. Alternatively, the positive electrode current collector may be formed of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in any of various forms, such as a film, a sheet, a foil, a net, a porous body, a foam body, and a non-woven fabric body.

The positive electrode active material is a material that is capable of inducing electrochemical reaction, and may include one or more of positive electrode active materials represented by Chemical Formulas 1 to 3 below.

$$Li_aCo_{1-x}M_xO_2 \tag{1}$$

$$Li_aMn_{2-y}M_yO_4 \tag{2}$$

$$Li_aFe_{1-z}M_zPO_4 \tag{3}$$

In the above formulas, $0.8 \leq a \leq 1.2$, $0 \leq x \leq 0.8$, $0 \leq y \leq 0.6$, and $0 \leq z \leq 0.5$, and M is one or more selected from the group consisting of Ti, Cd, Cu, Cr, Mo, Mg, Al, Ni, Nb, V, and Zr.

That is, the positive electrode active material may include one or more materials selected from the group consisting of a lithium metal oxide having a layered structure represented by Chemical Formula 1, a lithium-manganese-based oxide having a spinel structure represented by Chemical Formula 2, and a lithium-containing phosphate having an olivine structure represented by Chemical Formula 3.

Although the kind of the lithium metal oxide having the layered structure is not restricted, for example, one or more selected from the group consisting of lithium cobalt oxide, lithium nickel oxide, lithium manganese oxide, lithium cobalt-nickel oxide, lithium cobalt-manganese oxide, lithium manganese-nickel oxide, lithium nickel-manganese-cobalt oxide, and a material derived therefrom by substituting or doping with another element may be used.

The lithium nickel-manganese-cobalt oxide may be represented by $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl).

Although the kind of the lithium-manganese-based oxide having the spinel structure is also not restricted, for example, one or more selected from the group consisting of lithium manganese oxide, lithium nickel manganese oxide, and a material derived therefrom by substituting or doping with another element may be used.

In addition, although the kind of the lithium-containing phosphate having the olivine structure is also not restricted, for example, lithium iron phosphate or a material derived therefrom by substituting or doping with another element may be used.

The other element may be one or more selected from the group consisting of Al, Mg, Mn, Ni, Co, Cr, V, Fe and a doped material.

The binder is a component assisting in binding between the active material and the conductive agent and in binding with the current collector. The binder is generally added in an amount of 1 weight % to 30 weight % based on the total weight of the mixture including the positive electrode active material. For example, the binder may include one or more selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer (EPDM) rubber, styrene butadiene rubber, fluoro rubber, and a copolymer thereof.

The conductive agent is generally added so that the conductive agent accounts for 1 weight % to 30 weight % based on the total weight of the mixture including the positive electrode active material. The conductive agent is not particularly restricted, as long as the conductive agent exhibits conductivity without inducing any chemical change in a battery to which the conductive agent is applied. For example, graphite, such as natural graphite or artificial graphite; carbon black, such as ethylene black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; a conductive material, such as a polyphenylene derivative; graphene; or carbon nanotube may be used as the conductive agent.

The filler is an optional component used to inhibit expansion of the electrode. There is no particular limit to the filler, as long as the filler is formed of a fibrous material while the filler does not cause chemical changes in a battery to which the filler is applied. For example, a polyolefin-based polymer, such as polyethylene or polypropylene; or a fibrous material, such as glass fiber or carbon fiber is used as the filler.

The solid electrolyte may be a sulfide-based solid electrolyte, an oxide-based solid electrolyte, or a polymer-based solid electrolyte.

The sulfide-based solid electrolyte may contain a sulfur atom (S), may exhibit ionic conductivity of metal belonging to Group 1 or 2 of the periodic table, and may exhibit electron insulation. It is preferable for the sulfide-based solid electrolyte to contain at least Li, S, and P as elements and to exhibit high lithium ion conductivity; however, elements other than Li, S, and P may be included depending on purposes or circumstances.

Specifically, $Li_2S$—$P_2S_5$, $Li_2S$—$P_2S_5$—$LiCl$, $Li_2S$—$P_2S_5$—$H_2S$, $Li_2S$—$P_2S_5$—$H_2S$—$LiCl$, $Li_2S$—$LiI$—$P_2S_5$, $Li_2S$—$LiI$—$Li_2O$—$P_2S_5$, $Li_2S$—$LiBr$—$P_2S_5$, $Li_2SLi_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—$LiCl$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2SSiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—$LiI$, $Li_2S$—$SiS_2$—$LiI$, $Li_2S$—$SiS_2$—$Li_4SiO_4$, $Li_2SSiS_2$—$Li_3PO_4$, or $Li_{10}GeP_2S_{12}$ may be used as the sulfide-based inorganic solid electrolyte.

An amorphization method may be used as a method of synthesizing the sulfide-based inorganic solid electrolyte material. Examples of the amorphization method may include a mechanical milling method, a solution method, and a melting and rapid cooling method. Processing at a normal temperature (25° C.) is possible, and therefore it is possible to simplify the manufacturing process.

It is preferable for the oxide-based solid electrolyte to contain an oxygen atom (O), to exhibit ionic conductivity of metal belonging to Group 1 or 2 of the periodic table, and to exhibit electron insulation.

As the oxide-based solid electrolyte, for example, there may be used $Li_{xa}La_{ya}TiO_3$ (xa=0.3 to 0.7 and ya=0.3 to 0.7) (LLT), $Li_{xb}La_{yb}Zr_{zb}M^{bb}_{mb}O_{nb}$ (where $M^{bb}$ is one or more of Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$), $Li_{xc}B_{yc}M^{cc}_{zc}O_{nc}$ (where $M^{cc}$ is one or more of C, S, Al, Si, Ga, Ge, In, or Sn, xc satisfies $0 \leq xc \leq 5$, yc satisfies $0 \leq yc \leq 1$, zc satisfies $0 \leq zc \leq 1$, and nc satisfies $0 \leq nc \leq 6$), $Li_{xd}$ (Al, Ga)$_{yd}$ (Ti, Ge)$_{zd}Si_{ad}P_{md}O_{nd}$ (where $1 \leq xd \leq 3$, $0 \leq yd \leq 1$, $0 \leq zd \leq 2$, $0 \leq ad \leq 1$, $1 \leq md \leq 7$, and $3 \leq nd \leq 13$), $Li_{(3-2xe)}M^{ee}_{xe}D^{ee}O$ (where xe indicates a number between 0 and 0.1, $M^{ee}$ indicates a bivalent metal atom, and $D^{ee}$ indicates a halogen atom or a combination of two or more kinds of halogen atoms), $Li_{xf}Si_{yf}O_{zf}$ ($1 \leq xf \leq 5$, $0 < yf \leq 3$, and $1 \leq zf \leq 10$), $Li_{xg}S_{yg}O_{zg}$ ($1 \leq xg \leq 3$, $0 < yg \leq 2$, and $1 \leq zg \leq 10$), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w<1), $Li_{3.5}Zn_{0.25}GeO_4$ having a lithium super ionic conductor (LISICON) type crystalline structure, $La_{0.55}Li_{0.35}TiO_3$ having a perovskite type crystalline structure, $LiTi_2P_3O_{12}$ having a natrium super ionic conductor (NASICON) type crystalline structure, $Li_{1+xh+yh}(Al, Ga)_{xh}$ (Ti, Ge)$_{2-xh}Si_{yh}P_{3-yh}O_{12}$ (where $0 \leq xh \leq 1$ and $0 \leq yh \leq 1$), or $Li_7La_3Zr_2O_{12}$ (LLZ) having a garnet type crystalline structure. Alternatively, a phosphorus compound including Li, P, and O may also be used. For example, lithium phosphate ($Li_3PO_4$), LiPON in which a portion of oxygen in lithium phosphate is replaced by nitrogen, or $LiPOD^1$ ($D^1$ being one or more selected from among Ti, V, Cr, Mn, Fe, Co, Ni, Cu, Zr, Nb, Mo, Ru, Ag, Ta, W, Pt, and Au) may be used.

Alternatively, $LiA^1ON$ ($A^1$ being one or more selected from among Si, B, Ge, Al, C, and Ga) may also be used.

The polymer-based solid electrolyte may be a solid polymer electrolyte formed by adding a polymer resin to a lithium salt that is independently solvated or a polymer gel electrolyte formed by impregnating a polymer resin with an organic electrolytic solution containing an organic solvent and a lithium salt.

The solid polymer electrolyte is not particularly restricted as long as the solid polymer electrolyte is formed of, for example, a polymer material that is ionically conductive and is generally used as a solid electrolyte material of the all-solid-state battery. Examples of the solid polymer electrolyte may include a polyether-based polymer, a polycarbonate-based polymer, an acrylate-based polymer, a polysiloxane-based polymer, a phosphazene-based polymer, polyethylene oxide, a polyethylene derivative, an alkylene oxide derivative, a phosphoric acid ester polymer, poly agitation lysine, polyester sulfide, polyvinyl alcohol, polyvinylidene fluoride, and a polymer containing an ionic dissociation group. Alternatively, the solid polymer electrolyte may include a branch-like copolymer formed by copolymerizing an amorphous polymer, such as polymethylmethacrylate (PMMA), polycarbonate, polysiloxane, and/or phosphazene, which is a comonomer, in the main chain of polyethylene oxide (PEO), which is a polymer resin, a comb-like polymer resin, and a crosslinking polymer resin.

The polymer gel electrolyte includes an organic electrolytic solution including a lithium salt and a polymer resin, wherein the organic electrolytic solution is included in an amount of 60 to 400 parts by weight based on weight of the polymer resin. Although the polymer resin applied to the gel electrolyte is not limited to specific components, for example, a polyvinylchloride (PVC)-based resin, a polymethylmethacrylate (PMMA)-based resin, polyacrylonitrile (PAN), polyvinylidene fluoride (PVDF), and polyvinylidene fluoride hexafluoropropylene (PVDF-HFP) may be included.

In the negative electrode for all-solid-state batteries, lithium plating may occur on the lithiophilic material dispersed in the coating layer, and the ion transport layer may block passage of lithium agglutinated as the result of lithium plating. Consequently, plated lithium may grow only between the ion transport layer and the coating layer.

In a concrete example, the electrode assembly may be a mono-cell including one positive electrode and one negative electrode. A negative electrode is constituted by a combination of a coating layer including the lithiophilic material and an ion transport layer including the amorphous carbon, and the negative electrode for all-solid-state batteries may be configured such that the coating layer and the ion transport layer are formed only on the first surface among first and second surfaces of the negative electrode current collector, which are rectangular outer surfaces, and the positive electrode is disposed on the first surface, in consideration of the purpose of preventing lithium dendrites from growing toward the positive electrode.

The negative electrode having the coating layer and the ion transport layer formed only on the first surface thereof, as described above, may also be applied to a C-type bi-cell, which is configured such that a negative electrode is disposed at each of opposite surfaces of a positive electrode, and the first surface of the negative electrode may be disposed so as to face the positive electrode.

In another concrete example, the electrode assembly may be an A-type bi-cell, which is configured such that a positive electrode is disposed at each of opposite surfaces of a negative electrode. A negative electrode is constituted by a combination of a coating layer including the lithiophilic material and an ion transport layer including the amorphous carbon, and the negative electrode for all-solid-state batteries may be configured such that the coating layer and the ion transport layer are formed respectively on first and second surfaces of the negative electrode current collector, which are rectangular outer surfaces, and a first positive electrode and a second positive electrode are disposed respectively on the first and second surfaces, in consideration of the purpose of preventing lithium dendrites from growing toward the positive electrode.

Hereinafter, the present disclosure will be described with reference to the following examples. These examples are provided only for easier understanding of the present disclosure and should not be construed as limiting the scope of the present disclosure.

Example 1

In order to manufacture a positive electrode for all-solid-state batteries, $LiNi_{0.8}Co_{0.1}Mn_{0.1}O_2$, as a positive electrode active material, argyrodite ($Li_6PS_5Cl$), as a solid electrolyte, furnace black, as a conductive agent, and polytetrafluoroethylene, as a binder, were prepared in a weight ratio of 77.5:19.5:1.5:1.5, were dispersed in anisole, and were stirred to manufacture a positive electrode slurry. The positive electrode slurry was applied to an aluminum current collector having a thickness of 14 μm by doctor blade coating, and was dried in a vacuum state at 100° C. for 12 hours to manufacture a positive electrode.

In order to manufacture a solid electrolyte layer, argyrodite ($Li_6PS_5Cl$), as a solid electrolyte, and polytetrafluoroethylene, as a binder, were dispersed in anisole in a weight ratio of 95:5, and were stirred to manufacture a solid electrolyte layer slurry. The solid electrolyte layer slurry was applied to a polyethylene terephthalate release film by coating, and was dried in a vacuum state at 100° C. for 12 hours to form a solid electrolyte layer.

In order to manufacture a negative electrode for all-solid-state batteries including a coating layer and an ion transport layer, sputtering using Ag was performed on a nickel current collector having a thickness of 10 μm so as to have a size of 30 nm, whereby a coating layer constituted of an Ag layer was formed. Subsequently, a slurry constituted by a mixture of acetylene black and polyvinylidene fluoride mixed in a weight ratio of 97:3 was provided on the Ag layer by coating to form an ion transport layer, and the ion transport layer was dried, whereby a negative electrode having a multilayer structure was manufactured.

The positive electrode, the solid electrolyte layer, and the negative electrode were sequentially stacked to manufacture a lithium secondary battery.

Example 2

A lithium secondary battery was manufactured using the same method as in Example 1 except that furnace black was used instead of acetylene black in order to manufacture an ion transport layer.

Comparative Example 1

A lithium secondary battery was manufactured using the same method as in Example 1 except that a nickel current collector alone was used as a negative electrode without inclusion of a coating layer and an ion transport layer.

Comparative Example 2

A lithium secondary battery was manufactured using the same method as in Example 1 except that sputtering using Ag was performed on a nickel current collector so as to have a size of 30 nm, whereby only a coating layer was formed as a negative electrode.

Comparative Example 3

A lithium secondary battery was manufactured using the same method as in Example 1 except that a slurry constituted by a mixture of furnace black and polyvinylidene fluoride mixed in a weight ratio of 97:3 was provided on a nickel current collector by coating to form only an ion transport layer as a negative electrode.

Comparative Example 4

A lithium secondary battery was manufactured using the same method as in Example 1 except that a slurry constituted by a mixture of artificial graphite and polyvinylidene fluoride mixed in a weight ratio of 97:3 was provided on a nickel current collector by coating to form only an ion transport layer as a negative electrode.

Comparative Example 5

A lithium secondary battery was manufactured using the same method as in Example 1 except that natural graphite was used in order to manufacture an ion transport layer.

Comparative Example 6

A lithium secondary battery was manufactured using the same method as in Example 1 except that artificial graphite was used in order to manufacture an ion transport layer.

Comparative Example 7

A battery was manufactured using the same method as in Example 1 except that a mixture of furnace black and Ag mixed in a weight ratio of 3:1 was manufactured, and a mixture layer constituted by the mixture and polyvinylidene fluoride in a weight ratio of 97:3 was formed on a nickel current collector.

Comparative Example 8

A battery was manufactured using the same method as in Example 2 except that the ion transport layer manufactured according to Example 2 was formed on a nickel current collector, and a coating layer was formed on the ion transport layer.

Experimental Example 1

The batteries manufactured according to Examples 1 and 2 and Comparative Examples 1 to 8 were charged to 4.25 V at 0.05 C in a constant current-constant voltage mode at 60° C. and were discharged to 3.0 V at 0.05 C to measure initial charge and discharge capacities and efficiencies. The measured charge capacities, discharge capacities, and charging and discharging efficiencies, and short circuit occurrence rates are shown in Table 1 below.

TABLE 1

| | Charge capacity (mAh) | Discharge capacity (mAh) | Charging and discharging efficiency (%) | Short circuit occurrence rate (%) |
|---|---|---|---|---|
| Example 1 | 236 | 202 | 85.6 | 0 |
| Example 2 | 232 | 203 | 87.5 | 0 |
| Comparative Example 1 | 231 | 167 | 72.3 | 75 |
| Comparative Example 2 | 233 | 204 | 87.6 | 33 |
| Comparative Example 3 | 232 | 204 | 87.9 | 33 |
| Comparative Example 4 | 233 | 204 | 87.6 | 67 |
| Comparative Example 5 | 245 | 202 | 82.4 | 67 |
| Comparative Example 6 | 238 | 203 | 85.3 | 67 |
| Comparative Example 7 | 235 | 203 | 86.4 | 0 |
| Comparative Example 8 | 230 | 202 | 87.8 | 66 |

Referring to Table 1 above, the measured charging and discharging efficiencies of all of the lithium secondary batteries manufactured according to Examples and Comparative Examples were similar to each other, except Comparative Example 1.

It can be seen that, for Comparative Example 1, in which only the negative electrode current collector was used as the negative electrode, nucleation potential is high, whereby it is difficult to inhibit growth of lithium dendrites, and therefore charging and discharging efficiency is low and the short circuit occurrence rate is the highest.

It can be seen that, for Comparative Example 2, in which only the coating layer was formed on the negative electrode current collector, and Comparative Example 3, in which only the ion transport layer was formed on the negative electrode current collector, the short circuit occurrence rates are much lower than in Comparative Example 1.

Comparative Example 4, Comparative Example 5, and Comparative Example 6, in each of which crystalline carbon was used, exhibit very high short circuit occurrence rates.

In the case that a coating layer and an ion transport layer are sequentially formed on a current collector, as in Example 1 and Example 2, it is possible to lower nucleation potential, and it is impossible for lithium dendrites to grow through the ion transport layer, whereby no short circuit occurs.

For Comparative Example 7, in which the ion transport layer and the coating layer were mixed with each other, the short circuit occurrence rate is low; however, there is a problem in terms of number of times of charging and discharging with reference to Experimental Example 2 below.

For Comparative Example 8, in which the ion transport layer was formed on the current collector and the coating layer was formed on the ion transport layer, the measured short circuit occurrence rate is still high. The reason for this seems to be that lithium is deposited above the surface of the ion transport layer and/or the coating layer.

In the case that a negative electrode configured such that amorphous carbon is used for an ion transport layer is included, as described above, it is possible to manufacture a lithium secondary battery with improved safety.

Experimental Example 2

In order to evaluate lifespan characteristics of the batteries manufactured according to Examples 1 and 2 and Comparative Examples 1 to 8, the batteries were charged and discharged with a voltage range of 4.2 V to 3.7 V under 0.1 C charging/0.1 C discharging conditions.

Charging and discharging were performed until short circuit occurred. Table 2 below shows the number of cycles immediately before occurrence of short circuit and capacity retention.

TABLE 2

| | Number of cycles immediately before occurrence of short circuit | Capacity retention (%) |
|---|---|---|
| Example 1 | 400 | 81.3 |
| Example 2 | 400 | 81.3 |
| Comparative Example 1 | 9 | 64.2 |
| Comparative Example 2 | 121 | 77.7 |
| Comparative Example 3 | 18 | 74.5 |
| Comparative Example 4 | 5 | 75.4 |
| Comparative Example 5 | 4 | 71.3 |
| Comparative Example 6 | 8 | 79.5 |
| Comparative Example 7 | 183 | 78.2 |
| Comparative Example 8 | 48 | 76.1 |

Referring to Table 2 above, for Example 1 and Example 2, no short circuit occurred until charging and discharging were performed up to 400 times For Comparative Example 2, in which the coating layer was formed, and Comparative Example 3, in which the ion transport layer was formed, the number of times of charging and discharging was increased, whereby the lifespan characteristics thereof were improved, compared to Comparative Example 1; however, low capacity retention was still exhibited, compared to Example 1 and Example 2.

For Comparative Example 4, Comparative Example 5, and Comparative Example 6, in each of which crystalline carbon was used, the number of times of charging and discharging is very small.

Comparative Example 7, in which the mixture layer of the ion transport layer and the coating layer was used, exhibits higher capacity retention than Comparative Example 2 and Comparative Example 3. Comparative Example 8, in which the current collector, the ion transport layer, and the coating layer were formed in that order, exhibits later short circuit occurrence time than Comparative Example 3. However, it can be seen that the lifespan of each of the batteries according to Example 1 and Example 2 is twice or more that of the battery according to Comparative Example 7 and is about eight or more times that of the battery according to Comparative Example 8.

Comparative Example 5 and Comparative Example 6, which are different from each other only in that crystalline graphite were used for the ion transport layer, exhibit remarkably small number of times of charging and discharging while having a capacity retention of 70%, whereas Example 1 and Example 2, in which amorphous carbon was used for the ion transport layer, exhibits a capacity retention of 80% or more even at 400 times of charging and discharging.

Consequently, it can be seen that cycle characteristics are improved in the case that amorphous carbon is included in the ion transport layer.

Figure 2:
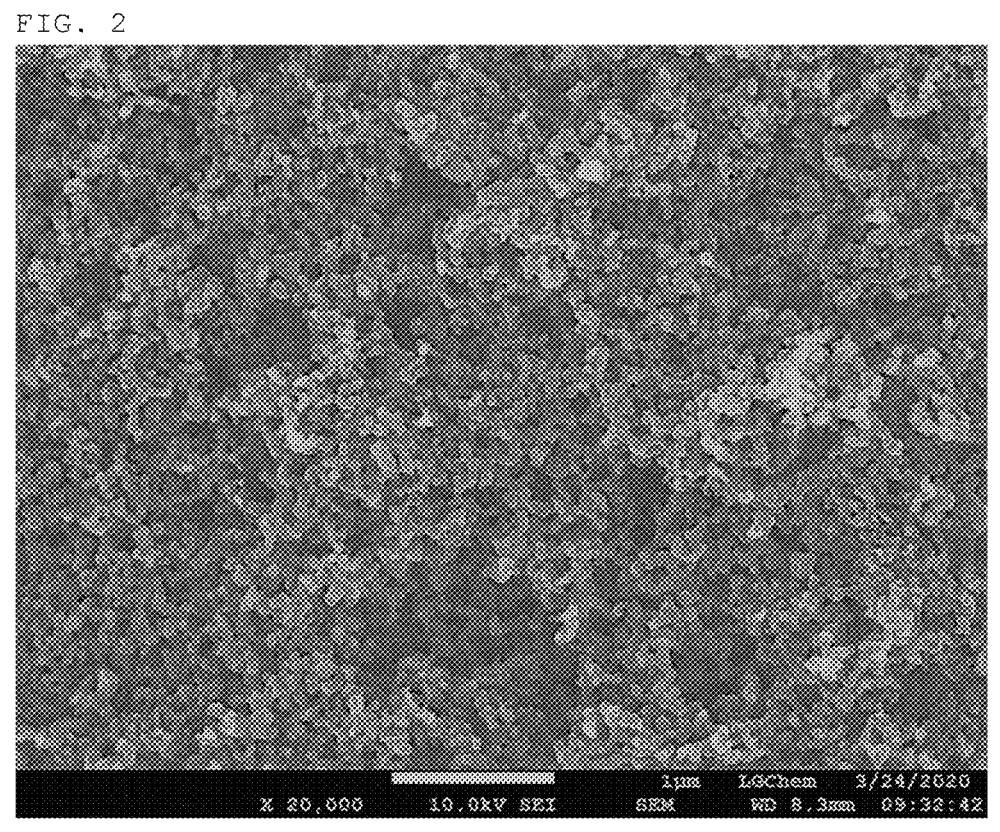
Figure 3:
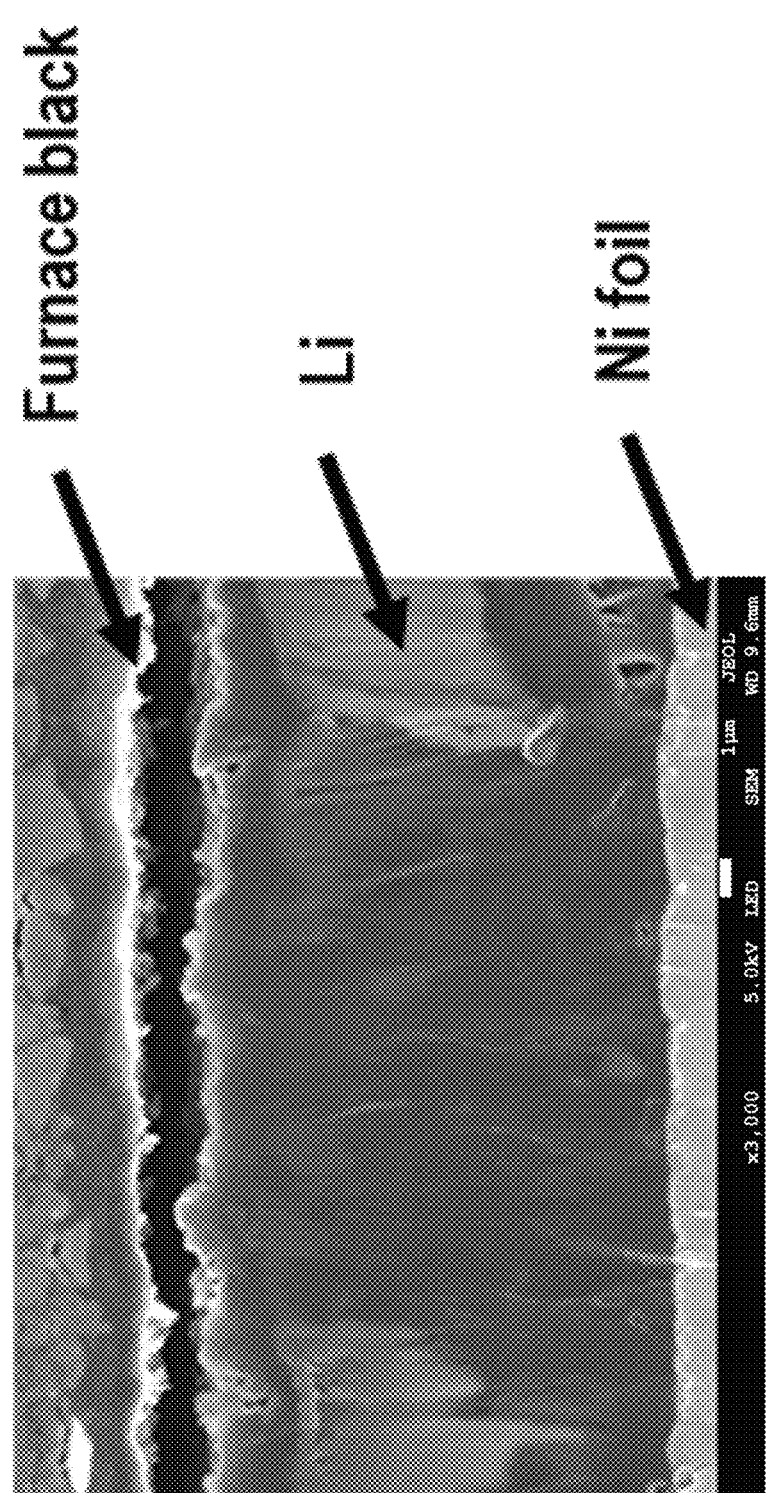
FIG. 3 is an SEM photograph of the section of the negative electrode manufactured according to Example 2.
Figure 4:
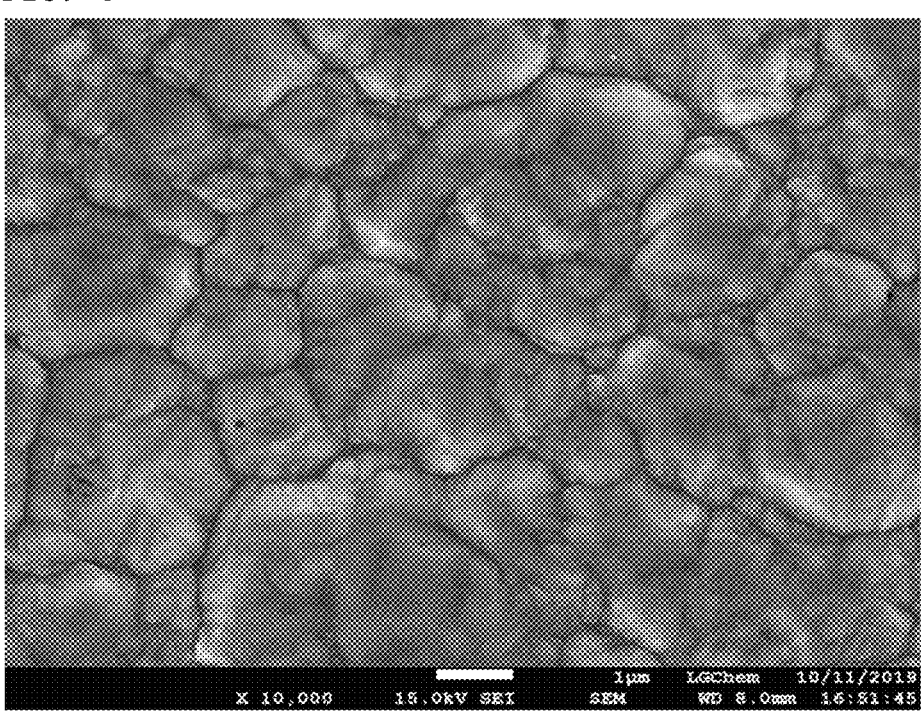
FIG. 4 is an SEM photograph of a negative electrode manufactured according to Comparative Example 1.
Figure 5:
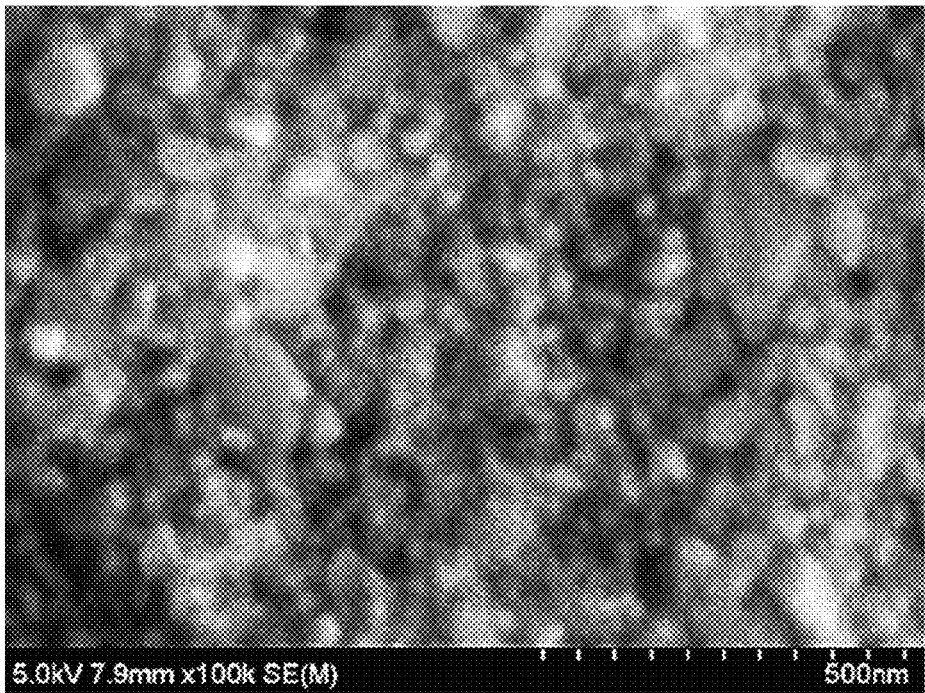
FIG. 5 is an SEM photograph of a negative electrode manufactured according to Comparative Example 2.
Figure 6:
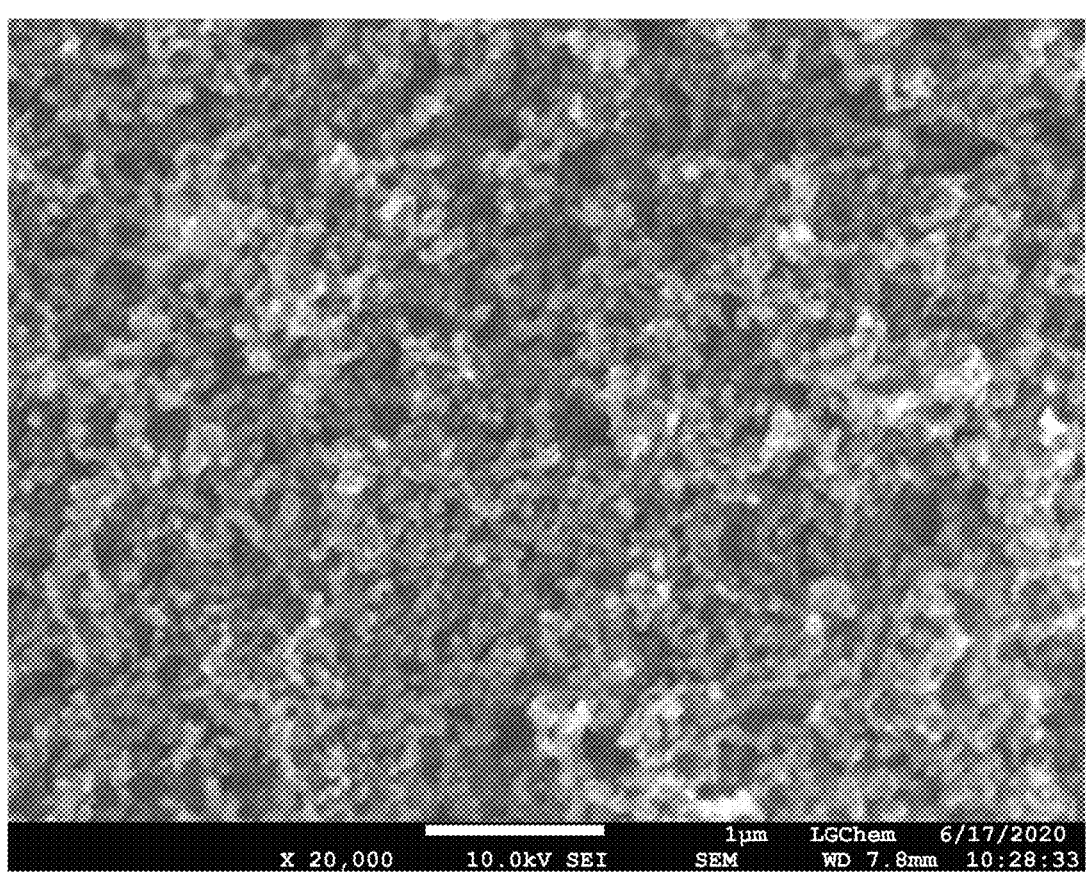
FIG. 6 is an SEM photograph of a negative electrode manufactured according to Comparative Example 3.
Figure 7:
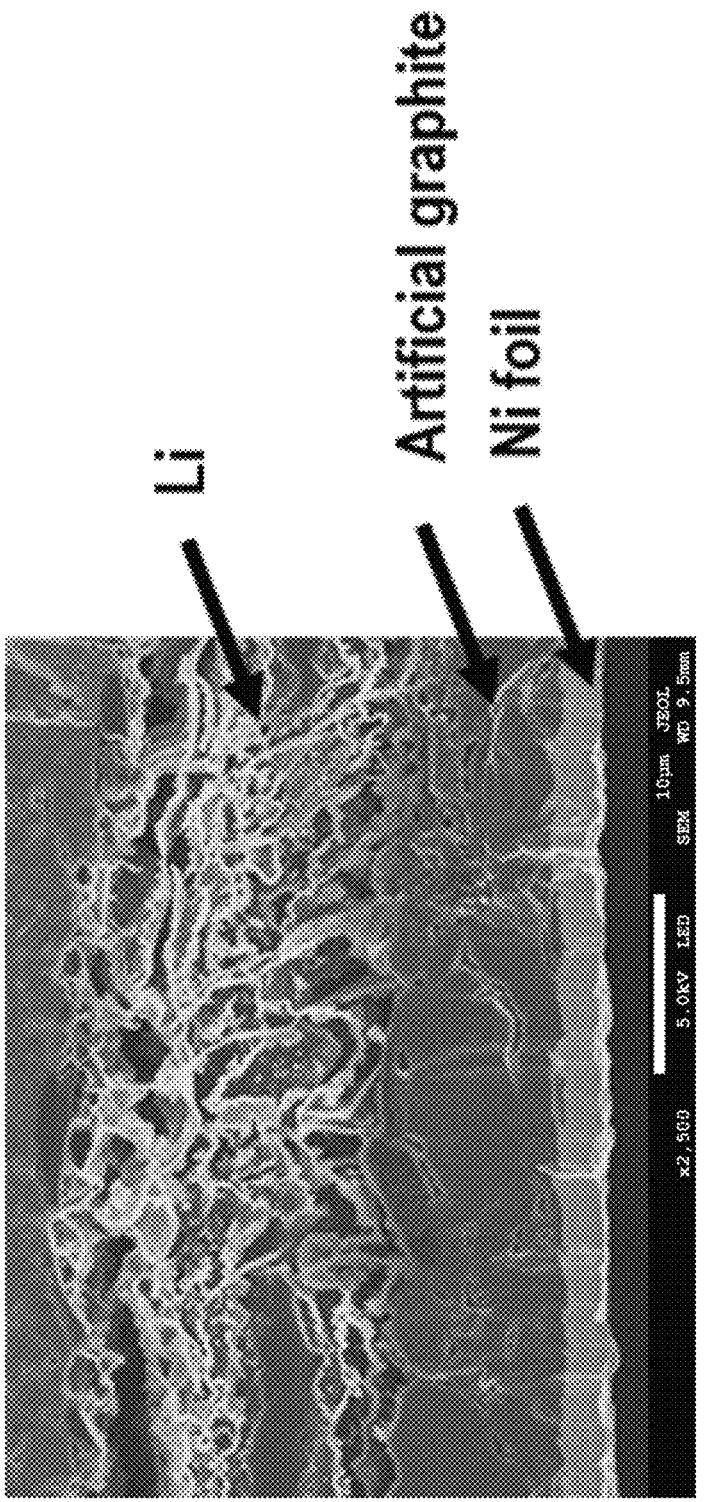
FIG. 7 is an SEM photograph of the section of a negative electrode manufactured according to Comparative Example 6.
Figure 8:
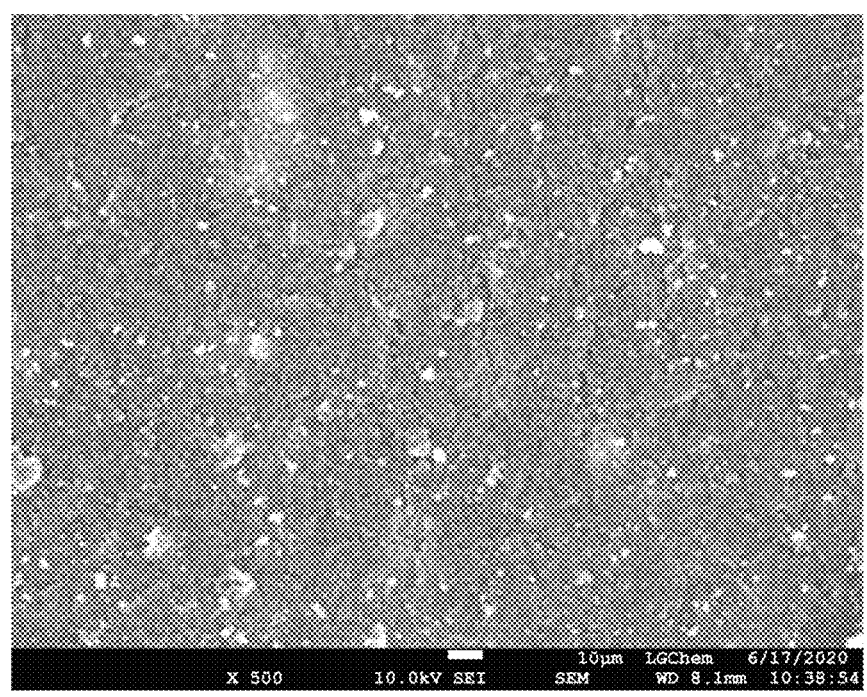
FIG. 8 is an SEM photograph of a negative electrode manufactured according to Comparative Example 7.
Figure 9:
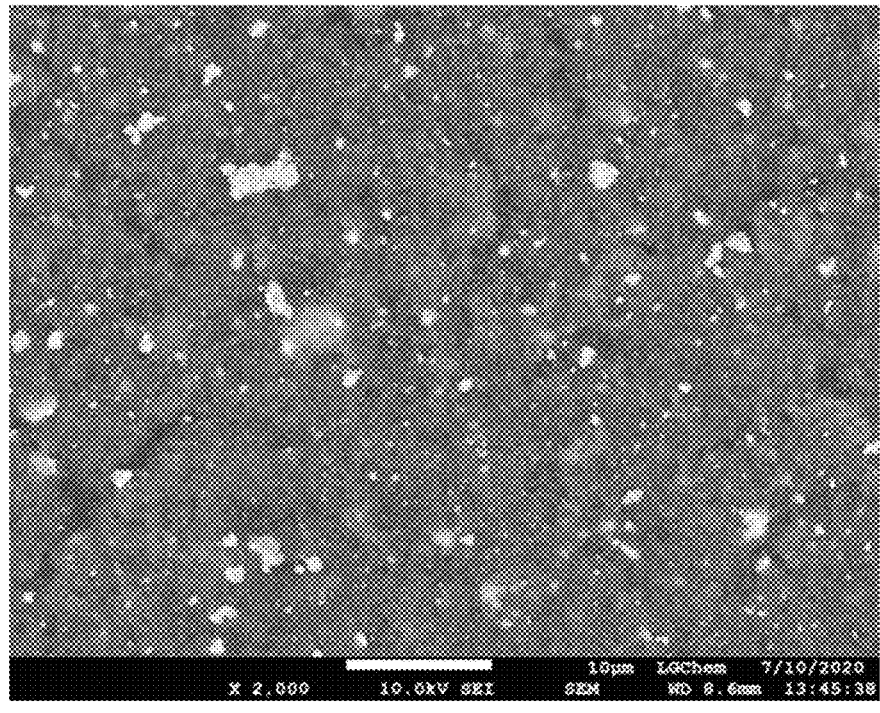
FIG. 9 is an SEM photograph of a negative electrode manufactured according to Comparative Example 8.

SEM photographs of negative electrodes manufactured according to Example 2, Comparative Examples 1 to 3, and Comparative Examples 6 to 8 are shown in FIGS. 2 to 9. FIG. 2 is an SEM photograph of the negative electrode manufactured according to Example 2, FIG. 3 is an SEM photograph of the section of the negative electrode manufactured according to Example 2, FIGS. 4, 5, and 6 are SEM photographs of the negative electrodes manufactured according to Comparative Examples 1, 2, and 3, respectively, and FIG. 7 is an SEM photograph of the section of the negative electrode manufactured according to Comparative Example 6. FIGS. 8 and 9 are SEM photographs of the negative electrodes manufactured according to Comparative Examples 7 and 8, respectively.

Referring to FIGS. 2 to 9, an ion transport layer is formed on the surface of each of the negative electrodes shown in FIG. 2 (Example 2) and FIG. 6 (Comparative Example 3). Since the ion transport layer has many pores formed therein, it can be seen that lithium ions are movable in a direction toward the negative electrode. In Example 2, the range of distribution of lithium ions in the coating layer is widened, whereby nucleation potential is lowered. Consequently, it is difficult for a lithium nucleus to be formed by lithium ions having passed through the ion transport layer. Even though the lithium nucleus is formed, the lithium nucleus cannot grow to such an extent that the lithium nucleus penetrates through the ion transport layer. Consequently, it may be interpreted that a short circuit occurrence rate of 0% is exhibited.

For Comparative Example 3 (FIG. 6), in which no coating layer is included, however, nucleation potential is high, whereby a lithium nucleus locally grows, and therefore the lifespan characteristics are lower than those of Comparative Example 2 (FIG. 5).

The negative electrode of FIG. 4 (Comparative Example 1) is the surface of a nickel current collector, and each of the negative electrodes of FIG. 5 (Comparative Example 2) and FIG. 9 (Comparative Example 8) has a coating layer formed on the surface thereof. As can be seen from the above experimental result, Comparative Example 8 exhibits higher short circuit occurrence rate and worse lifespan characteristics than Comparative Example 2.

The negative electrode of FIG. 8 (Comparative Example 7) has a mixture layer formed on the surface thereof, and exhibits a short circuit occurrence rate of 0%, but exhibits worse lifespan characteristics than those of Examples 1 and 2, in each of which the ion transport layer is formed on the coating layer.

FIG. 3 is an SEM photograph of the section of the negative electrode manufactured according to Example 2, and FIG. 7 is an SEM photograph of the section of the negative electrode manufactured according to Comparative Example 6.

Referring to FIG. 3, it can be seen that, in the negative electrode of Example 2, lithium was electrodeposited on the surface of the ion transport layer including furnace black that faced the negative electrode current collector (Ni foil).

Referring to FIG. 7, it can be seen that, in the negative electrode of Comparative Example 6, lithium was electrodeposited on the surface of the ion transport layer including artificial graphite opposite the surface of the ion transport layer that faced the negative electrode current collector (Ni foil).

That is, in the case where crystalline graphite, such as artificial graphite, is included in the ion transport layer, lithium electrodeposition occurs on the outer surface of the ion transport layer in a direction facing the positive electrode. As a result, lithium dendrites may grow, may penetrate through the solid electrolyte layer, and may come into contact with the positive electrode, whereby short circuit occurs after a small number of times of charging and discharging.

In contrast, in the case that an ion transport layer including amorphous carbon, such as furnace black, is included, lithium electrodeposition occurs on the outer surface of the ion transport layer only in a direction toward the negative electrode current collector, whereby it is possible to secure high cycle characteristics and capacity retention, and therefore it is possible to provide a lithium secondary battery with improved performance.

Those skilled in the art to which the present disclosure pertains will appreciate that various applications and modifications are possible within the category of the present disclosure based on the above description.

The present disclosure relates to a negative electrode for all-solid-state batteries including a coating layer and an ion transport layer and a lithium secondary battery including the same. More particularly, the present disclosure relates to technology capable of preventing lithium plating from locally occurring on a negative electrode and specifying a lithium electrodeposition position, thereby preventing the occurrence of short circuit between a positive electrode and the negative electrode, and therefore the present disclosure has industrial applicability.

The invention claimed is:

1. A negative electrode for all-solid-state batteries, the negative electrode comprising:

a negative electrode current collector formed of an electrically conductive metal material;

a lithiophilic material dispersed on a surface or opposite surfaces of the negative electrode current collector; and an ion transport layer on the lithiophilic material, the ion transport layer comprising amorphous carbon configured to allow lithium ions to move therethrough, wherein the lithiophilic material is disposed such that at least a part of the negative electrode current collector is exposed.

2. The negative electrode according to claim 1, wherein the ion transport layer further comprises a binder.

3. The negative electrode according to claim 1, wherein the negative electrode current collector does not comprise a negative electrode mixture layer formed thereon.

4. The negative electrode according to claim 1, wherein the lithiophilic material is one or more of a metal comprising Au, Ag, Pt, Zn, Si, or Mg, or a metal oxide comprising CuO, ZnO, CoO, or MnO.

5. A lithium secondary battery comprising the negative electrode according to claim 1, a solid electrolyte layer, and a positive electrode.

6. The lithium secondary battery according to claim 5, wherein lithium (Li) plating occurs on the lithiophilic material.

7. The lithium secondary battery according to claim 5, wherein lithium electrodeposition occurs on one surface of the ion transport layer of the negative electrode that faces the negative electrode current collector.

8. The lithium secondary battery according to claim 5, wherein the lithium secondary battery includes a mono-cell in which the lithiophilic material and the ion transport layer are formed only on the first surface among first and second surfaces of the negative electrode current collector, and the positive electrode is disposed on the first surface.

9. The lithium secondary battery according to claim 8, wherein the lithiophilic material is formed on the negative electrode current collector, and the ion transport layer is formed on the lithiophilic material.

10. The lithium secondary battery according to claim 5, wherein the lithium secondary battery includes a bi-cell in which the lithiophilic material and the ion transport layer are formed on each of first and second surfaces of the negative electrode current collector, and the positive electrode comprises a first positive electrode and a second positive electrode disposed respectively on the first surface and the second surface.

11. The lithium secondary battery according to claim 10, wherein the lithiophilic material is formed on the negative electrode current collector, and the ion transport layer is formed on the lithiophilic material.

12. A lithium secondary battery comprising the negative electrode according to claim 2, a solid electrolyte layer, and a positive electrode.

13. A lithium secondary battery comprising the negative electrode according to claim 3, a solid electrolyte layer, and a positive electrode.

14. A lithium secondary battery comprising the negative electrode according to claim 4, a solid electrolyte layer, and a positive electrode.

15. The lithium secondary battery according to claim 13, wherein lithium (Li) plating occurs on the lithiophilic material.

16. The lithium secondary battery according to claim 13, wherein lithium electrodeposition occurs on one surface of the ion transport layer of the negative electrode that faces the negative electrode current collector.

17. The lithium secondary battery according to claim 13, wherein the lithium secondary battery includes a mono-cell in which the lithiophilic material and the ion transport layer are formed only on the first surface among first and second surfaces of the negative electrode current collector, and the positive electrode is disposed on the first surface.

18. The lithium secondary battery according to claim 17, wherein the lithiophilic material is formed on the negative electrode current collector, and the ion transport layer is formed on the lithiophilic material.

19. The lithium secondary battery according to claim 13, wherein the lithium secondary battery includes a bi-cell in which the lithiophilic material and the ion transport layer are formed on each of first and second surfaces of the negative electrode current collector, and the positive electrode comprises a first positive electrode and a second positive electrode disposed respectively on the first surface and the second surface.

20. The lithium secondary battery according to claim 19, Wherein the lithiophilic material is formed on the negative electrode current collector, and the ion transport layer is formed on the lithiophilic material.

* * * * *